(12) United States Patent
Russell

(10) Patent No.: US 10,317,180 B2
(45) Date of Patent: Jun. 11, 2019

(54) ARROW NOCK WITH REMOTELY ACTIVATED AUDIO TRANSDUCER

(71) Applicants: Brian Russell, Chilton, WI (US); John Michael Watkins, Claremont, CA (US)

(72) Inventor: Brian Russell, Chilton, WI (US)

(73) Assignees: Brian Russell, Chilton, WI (US); John Michael Watkins, Claremont, CA (US)

( * ) Notice: Subject to any disclaimer, the term of this patent is extended or adjusted under 35 U.S.C. 154(b) by 0 days.

(21) Appl. No.: 15/660,830

(22) Filed: Jul. 26, 2017

(65) Prior Publication Data

US 2019/0033049 A1    Jan. 31, 2019

(51) Int. Cl.
| | | |
|---|---|---|
| *F42B 6/04* | (2006.01) | |
| *F42B 12/36* | (2006.01) | |
| *F42B 6/06* | (2006.01) | |
| *F42B 12/38* | (2006.01) | |
| *H04W 4/80* | (2018.01) | |

(52) U.S. Cl.
CPC .............. *F42B 12/362* (2013.01); *F42B 6/06* (2013.01); *F42B 12/385* (2013.01); *H04W 4/80* (2018.02)

(58) Field of Classification Search
CPC ........ F42B 6/04; F42B 12/362; F42B 12/365; F42B 12/385
USPC .................................................. 473/570, 578
See application file for complete search history.

(56) References Cited

U.S. PATENT DOCUMENTS

| | | |
|---|---|---|
| 3,759,519 A | 9/1973 | Palma |
| 4,421,319 A | 12/1983 | Murphy |
| 4,749,198 A * | 6/1988 | Brailean ............... F42B 12/385 340/636.1 |
| 4,772,029 A | 9/1988 | Watkins |
| 4,795,165 A | 1/1989 | Tehan |
| 4,836,557 A | 6/1989 | Polando |
| 4,951,952 A | 8/1990 | Saddler |
| 5,141,229 A | 8/1992 | Roundy |
| 5,251,907 A | 10/1993 | Ady |
| 5,465,980 A | 11/1995 | Maurin |
| 5,468,000 A | 11/1995 | Bennett |
| 6,364,499 B1 | 4/2002 | Jones |
| 6,612,947 B2 * | 9/2003 | Porter ................... F42B 12/385 473/578 |
| 6,736,742 B2 | 5/2004 | Price et al. |
| 6,814,678 B2 | 11/2004 | Cyr et al. |
| 6,856,250 B2 * | 2/2005 | Hilliard ................ G01S 13/758 102/502 |
| 7,232,389 B2 | 6/2007 | Monteleone |
| 7,300,367 B1 * | 11/2007 | Andol ...................... F42B 6/04 342/385 |
| 7,331,887 B1 * | 2/2008 | Dunn .................... F42B 12/385 455/98 |

(Continued)

*Primary Examiner* — Alexander R Niconovich

(74) *Attorney, Agent, or Firm* — Joseph C. Andras; Myers Andras LLP

(57) ABSTRACT

A tracking system for locating arrows used in bow-and-arrow hunting is disclosed. The tracking system comprises a hand-held transmitter operated by a user and a receiving module embedded in an arrow. A user may locate an arrow after shooting my activating the transmitter to emit an RF signal. The receiving module in the arrow receives the RF signal and emits a sound or illuminates a LED. The transmitter may be configured to locate specific arrows of a quiver by sending an individualized RF signal to which only a specific arrow receiving module is responsive.

20 Claims, 8 Drawing Sheets

(56) References Cited

U.S. PATENT DOCUMENTS

| | | | | |
|---|---|---|---|---|
| 8,075,430 B1* | 12/2011 | Hester | .................... | F42B 12/385 |
| | | | | 473/578 |
| 8,128,520 B2* | 3/2012 | Miner | ................... | F42B 12/387 |
| | | | | 473/578 |
| 8,192,309 B1* | 6/2012 | Roberts | ................ | F42B 12/385 |
| | | | | 473/578 |
| 8,216,097 B2* | 7/2012 | Nick | .................... | F42B 12/385 |
| | | | | 473/578 |
| 8,366,573 B2 | 2/2013 | Hunt | | |
| 8,393,982 B2* | 3/2013 | Ferguson | .............. | F42B 12/385 |
| | | | | 473/578 |
| 8,425,354 B2* | 4/2013 | Ferguson | ................. | F42B 6/04 |
| | | | | 473/578 |
| 8,795,109 B2* | 8/2014 | Roman | .................... | F42B 6/04 |
| | | | | 473/570 |
| 8,952,808 B2* | 2/2015 | Steinman | ............... | G08C 19/00 |
| | | | | 340/539.13 |
| 9,307,300 B2* | 4/2016 | DiSanto | ................ | G08C 19/16 |
| 2003/0176245 A1 | 9/2003 | Cyr | | |
| 2007/0142137 A1 | 6/2007 | Davenhaver | | |
| 2008/0051231 A1 | 2/2008 | Everett | | |
| 2008/0102996 A1 | 5/2008 | Erhard | | |
| 2008/0207357 A1* | 8/2008 | Savarese | ............ | A63B 24/0021 |
| | | | | 473/407 |
| 2008/0287229 A1* | 11/2008 | Donahoe | ................... | F41B 5/14 |
| | | | | 473/570 |
| 2010/0035709 A1* | 2/2010 | Russell | ................ | F42B 12/385 |
| | | | | 473/570 |
| 2013/0176175 A1* | 7/2013 | Zusman | ............... | G01S 5/0226 |
| | | | | 342/458 |

* cited by examiner

ARROW NOCK WITH REMOTELY ACTIVATED AUDIO TRANSDUCER

BACKGROUND OF THE INVENTION

1. Field of the Invention

The present invention relates in general to the sport of bow and arrow hunting. More particularly, the invention is directed to arrows having a signal receiving capability and a sound transducer.

2. Description of the Related Art

Bow and arrow hunting is a popular sport around the world. One drawback of bow and arrow hunting is that hunters may not always recover arrows that have been shot. After shooting an arrow, a bow hunter may miss or pass through a target such that the arrows may become buried in a thatch of grass or lost in a field. Often, the hunter may not be able to locate and recover the lost arrow.

Accordingly, a need exists to improve the ability to locate lost arrows and accessories such as Broad heads which are considerable in cost.

SUMMARY OF THE INVENTION

In the first aspect, an arrow nock assembly is disclosed. The arrow nock assembly comprises a nock for an arrow, the nock having a bow string receiving portion and a nock internal cavity opposite from the bow string receiving portion and a receiving module coupled to the nock. The receiving module comprises a receiving antenna for receiving electromagnetic radiation, a detection circuit coupled to the receiving antenna, the detection circuit analyzing the electromagnetic radiation to determine if an identification signal associated with the arrow was received, a sound actuator coupled to the detection circuit, the sound actuator generating sound if the identification signal was associated with the specific arrow and a power source for energizing the receiving module. The receiving module is configured to be embedded in an arrow.

In a first preferred embodiment, the arrow nock assembly further comprises a generally cylindrical locking portion coupled to the arrow nock assembly, wherein the locking portion is configured to couple with a shaft of the arrow. The detection circuit preferably further comprises a microprocessor. The detection circuit preferably further comprises a super-heterodyne receiver for use with amplitude-shifted keyed data. The detection circuit preferably further comprises a Bluetooth receiving module. The detection circuit preferably further comprises an RFID device. The arrow nock assembly preferably further comprises a Light Emitting Diode ("LED"). The sound annunciator preferably comprises a piezo-electric transducer.

In a second aspect, an arrow receiving module configured to be embedded in an arrow is disclosed. The receiving module comprises an antenna for receiving electromagnetic radiation, a detection circuit coupled to the antenna, the detection circuit analyzing the electromagnetic radiation to determine if an identification signal was received, a sound actuator coupled to the detection circuit, the sound actuator generating sound when the identification signal was received and a power source for energizing the receiving module.

In a second preferred embodiment, the detection circuit further comprises a microprocessor. The detection circuit preferably further comprises a super-heterodyne receiver for use with amplitude-shifted keyed data. The detection circuit preferably further comprises a Bluetooth receiving module. The detection circuit preferably further comprises an RFID device. The arrow receiving module preferably further comprises a Light Emitting Diode ("LED"). The sound annunciator preferably comprises a piezo-electric buzzer.

In a third aspect, an arrow having an arrow receiving module is disclosed. The arrow comprises an arrow shaft having a distal and a proximal end, a nock coupled to the proximal end of the arrow shaft, the nock having a nock internal cavity, and an arrow receiving module embedded within the arrow. The arrow receiving module comprises an antenna for receiving electromagnetic radiation, a detection circuit coupled to the antenna, the detection circuit analyzing the electromagnetic radiation to determine if an identification signal was received, a sound actuator coupled to the detection circuit, the sound actuator generating sound when the identification signal was received and a power source for energizing the receiving module.

In a third preferred embodiment, the detection circuit further comprises a microprocessor. The detection circuit preferably further comprises a super-heterodyne receiver for use with amplitude-shifted keyed data. The detection circuit preferably further comprises a Bluetooth receiving module. The detection circuit preferably further comprises an RFID device.

These and other features and advantages of the invention will become more apparent with a description of preferred embodiments in reference to the associated drawings.

DETAILED DESCRIPTION OF THE PREFERRED EMBODIMENTS

Figure 1:
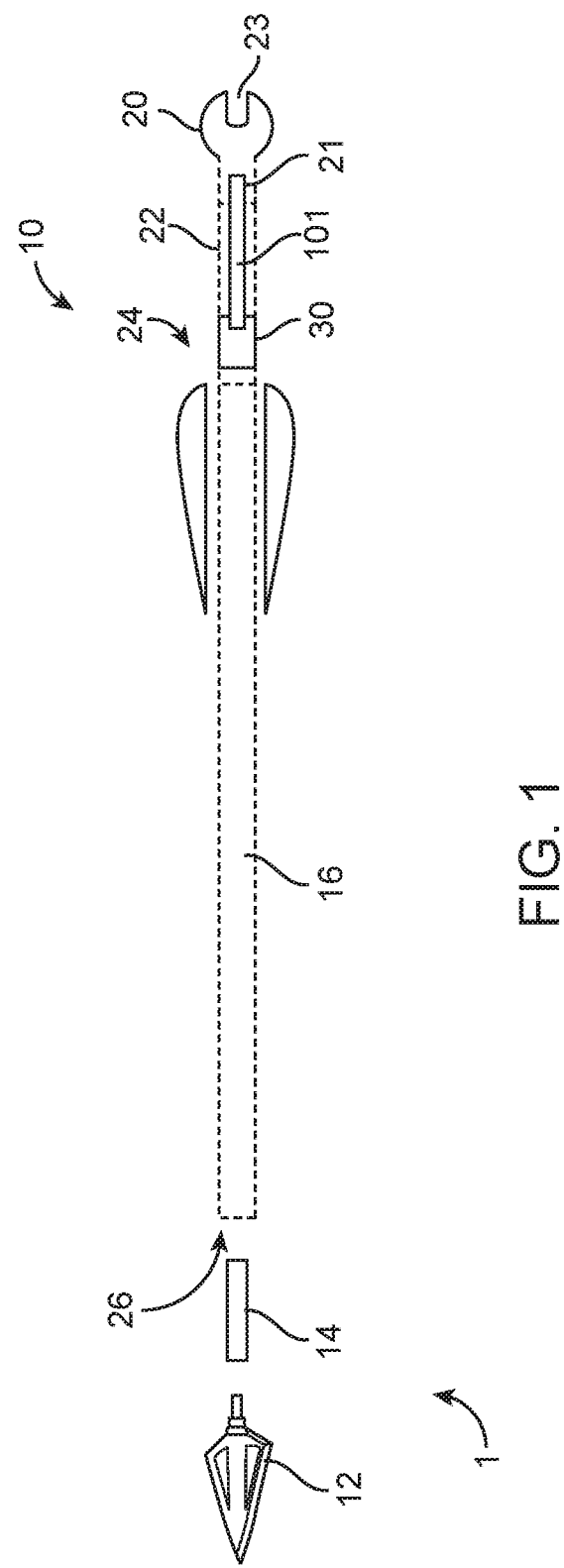
FIG. 1 is a side, exploded view of an exemplary arrow having an arrow nock assembly in an embodiment.

Bow and arrow hunting has existed for tens of thousands of years. The popularity of bow hunting and archery has skyrocketed over the last several years, and has, by some estimates, become one of the fastest growing sports in America. The sport requires two main components: bows and arrows. Bows can range in price from relatively inexpensive for basic bows to higher priced compound bows. Arrows can also range in price where Broadhead arrows may cost $25 to $30 each.

However, one of the primary costs of bow hunting may be those costs associated with the replenishing lost arrows. After shooting an arrow, a bow hunter may miss or pass through a target such that the arrows may become buried in a thatch of grass or lost in a field. Sometimes the chances of locating a lost arrow can be rather low, perhaps less than 25% of the lost arrows recovered. Hence there is a need for locating arrows more effectively.

In one or embodiments, a hunter may modify a commercially available arrow by removing the original nock from the arrow, and replacing it with an arrow nock assembly that has a remotely activated audio transducer in one or more embodiments. The arrow nock assembly may have a radio frequency ("RF") receiver which, when activated, will sound the audio transducer. A handheld transmitter is employed to activate the arrow nock assembly. After a hunt, the hunter may retrieve lost arrows by activating a button on the handheld transmitter which causes the lost arrow to make a sound such as a chirping sound, or to illuminate an LED ("Light Emitting Diode").

In one or more embodiments, the handheld transmitter may have multiple buttons which cause the transmitter to emit differing radio frequencies or may cause the transmitter to emit differing RF digital signal codes. Each of the arrow nock assemblies is configured to respond only to a specific radio frequency or digital signal code. Hence, the hunter may then locate a specific arrow that is lost without activating the arrows held in the hunter's quiver. These features allow the hunter to retrieve arrows that would otherwise be lost and to determine when the arrows are to be located so that the hunt is not otherwise ruined.

Embedding such sophisticated technology into an arrow would have been very difficult to implement just ten or twenty years ago, but recent advancements in the field of semiconductor nanotechnology have led to an unprecedented miniaturization of electronic components. Recent advancements have led to the fabrication of microprocessors—similar to those used in computers and smart phones—having a footprint of approximately 2.0 millimeters×2.0 millimeters for example. Hence, a microprocessor may be fabricated to a size that matches that of a grain of sand. The costs of this technology have also decreased such that advanced electronic devices and integrated circuits can be now used in many everyday items.

Teachings relating to the arrows disclosed in U.S. patent application Ser. No. 12/536,306 filed Aug. 5, 2009 titled "METHOD FOR EMPLOYING A TRACKING DEVICE WITH AN ARROW" which was published on Feb. 11, 2010 may be employed herein and the disclosure of which is incorporated herein by reference in its entirety. As used herein, the term "arrow" refers to arrows employed in archery and bow hunting, and may refer to projectiles that may have a length in the range of approximately 20 inches to approximately 35 inches, and may have a diameter of the arrow shaft in the range of approximately 0.20 inches to 0.40 inches.

The description herein refers to several schematic, block diagrams which may illustrate the main architecture of the electronic components and integrated circuits of one or more embodiments. However, it shall be understood that other electronic components and circuits may be implicitly employed such as circuitry for power, support components for energizing and controlling other electronic components and circuits, and other circuitry for interfacing between components. The modules or blocks may represent a single component such as an integrated circuit, or may represent multiple components in a circuit. The schematic block diagrams illustrate one or more embodiments for having a transmitter module to receive an input from a user, where the transmitter module transmits a signal to a receiving module, which then responds to alert the user by making a sound or illuminating a light. However, it shall be understood that other circuits and components may be used to accomplish the functionality described herein and other circuits and components are contemplated in one or more embodiments.

FIG. 1 is a side, exploded view of an exemplary arrow 1 having an arrow nock assembly 100 with a receiving module 101 in an embodiment. The arrow 1 comprises an arrow shaft 16 which is coupled to the Broadhead 12 with a threaded insert 14. The arrow shaft 16 has a distal end 26 and a proximal end 24. The distal end 26 is coupled to the insert 14. The arrow shaft 16 may have fletching 18 near the proximal end 24 of the arrow shaft 16 which may stabilize the flight of the arrow 1.

The arrow nock assembly 100 comprises a nock 20, a receiving module 101, a generally cylindrical locking portion 30, and a tube 22. The nock 20 has a bow string receiving portion 23 and an internal cavity 21 opposite the bow string receiving portion 23. The receiving module 101 is coupled to the nock 20 such as by being placed and secured within the nock internal cavity 21. The receiving module 101 is also coupled to the locking portion 30, and may be embedded within the tube 22. The locking portion 30 of the arrow nock assembly 100 is configured to couple with the arrow shaft 16, such as through a pressure fit. In an embodiment, a hunter may modify commercially available arrows by removing the original nock and replacing it with the arrow nock assembly 100.

Figure 2:
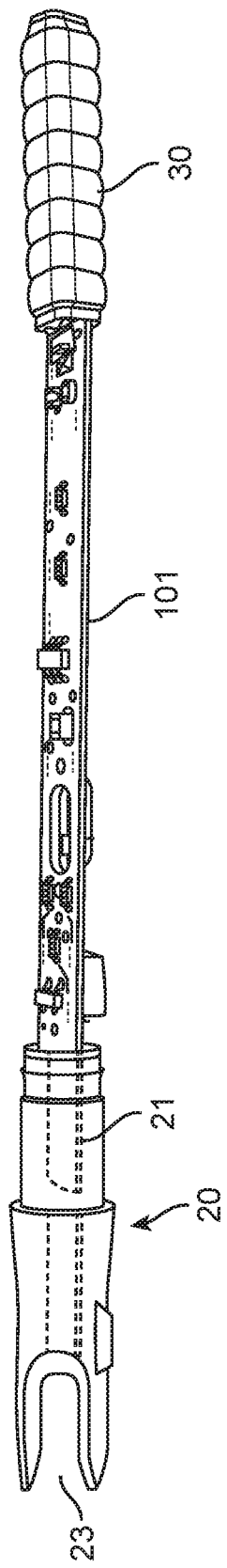
FIG. 2 is a side, perspective view of the arrow nock assembly having an arrow receiving module.

FIG. 2 is a side, perspective view of the arrow nock assembly 100. In an embodiment, the receiving module 101 may comprise a printed circuit board having electronic circuitry and electronic components. The locking portion 30 is designed to couple with the arrow shaft 16 with a pressure fit.

Figure 3:
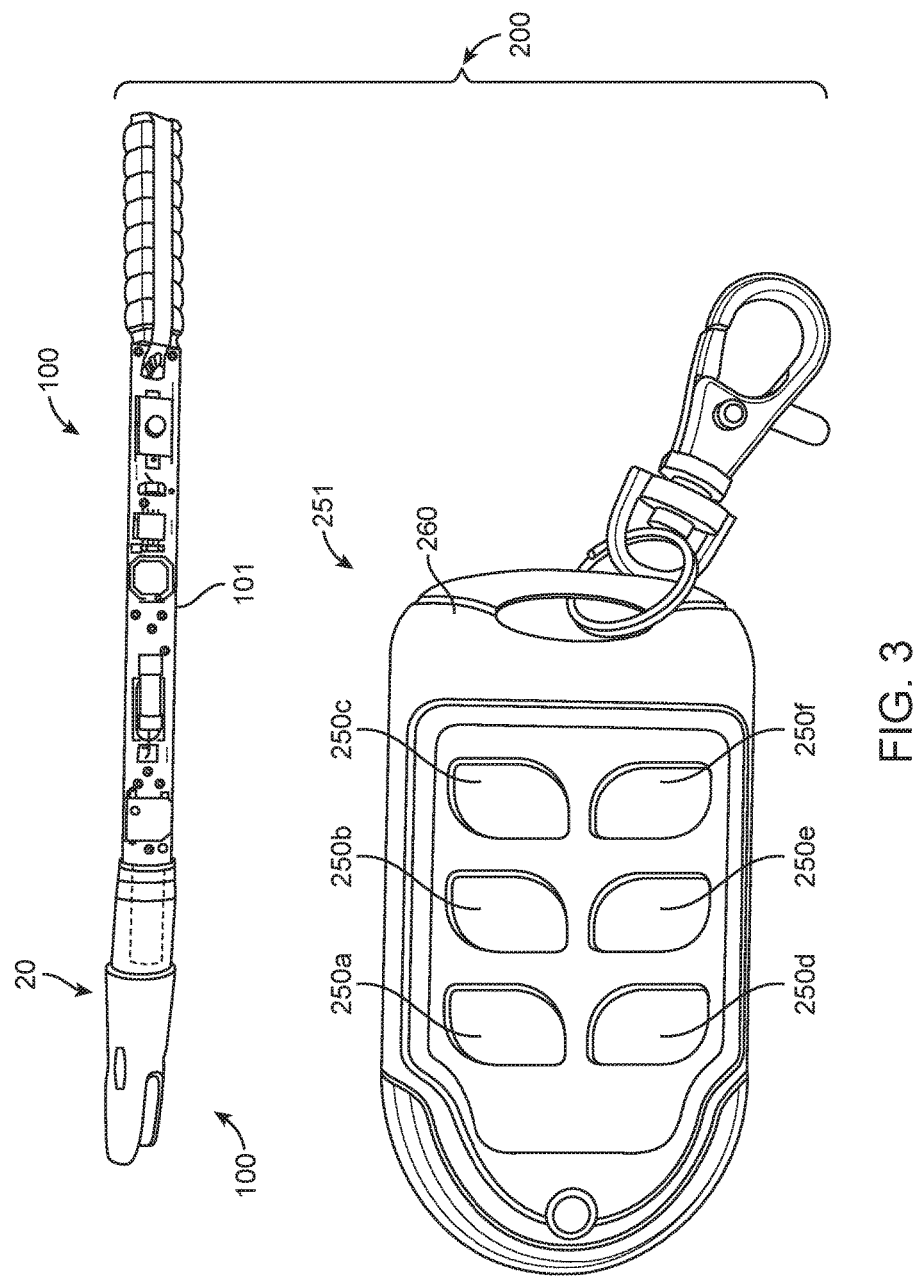
FIG. 3 is a view of an arrow tracking system comprising a transmitter module in the form of a key fob and a receiving module held within the nock assembly.

FIG. 3 is a view of an arrow tracking system 200 comprising a transmitter module 251 in the form of a key fob 260 and a receiving module 101 held within the nock assembly 100 in one or more embodiments. The transmitting key fob 260 has at least one button, and, as shown, has six buttons (i.e., switches) 250a, 250b, 250c, 250d, 250e, and 250f in an embodiment. As discussed in greater detail below, each of the buttons 250a-250f on the key fob 260 is configured to activate one of six receiving modules 101 embedded in six arrows 1 in one embodiment to the exclusion of other arrows. Arrow 1 may be labeled in a manner to indicate which of the key fob buttons 250a-250f will activate that specific arrow to the exclusion of other arrows. For example, the arrows 1 and the buttons 250a-250f may be colored coded, where a "red" button 250a may activate a specific arrow 1 which has a "red" insignia. In another embodiment, the buttons 250a-250f and the corresponding arrow may each be labeled with a number (e.g., "1"), a letter (e.g., "A") or other symbol.

Hence, after a hunter shoots several arrows during a hunt and wishes to locate the lost arrows, the hunter may simply check his quiver to see which arrows are missing. For example, assume that the hunter sees 5 arrows labeled with a color other than red in his quiver, the hunter will realize that the "red" colored arrow is missing. The hunter then presses the "red" button on the key fob 260 and the missing "red" arrow will begin to make a noise such as a chirping sound, while the other five arrows in his quiver remain silent. One or more embodiments offer the hunter the benefits of controlling when the arrow begins to chirp such at the end of a hunt, and also lets the hunter locate individual arrows quickly. The triggering range may be in the range of approximately 35 feet to approximately 60 feet.

In one or more embodiments, the key fob 260 may only have a single button which activates all of the arrows in the hunter's quiver. The hunter may also retrieve the missing arrows at the hunter's convenience, but will activate all of arrows including the arrows not missing.

FIGS. 4-7 present several schematic, block diagrams of electronic circuits and components employed in one or more embodiments. The diagrams are presented as an overview of the main components of one or more embodiments. It shall be understood that the schematics may also include other components and circuitry such as for power, support electronics, and interfacing between components for example.

Figure 4:
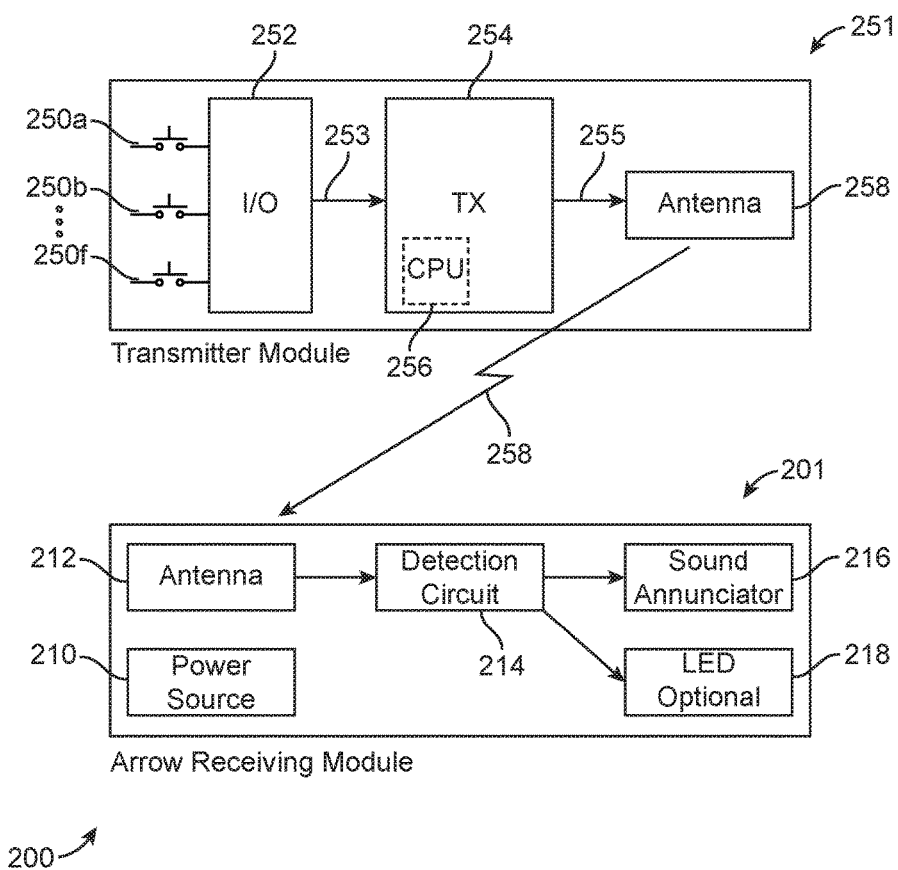
FIG. 4 is a schematic block diagram of an arrow tracking system comprising a transmitter module and a receiving module.

FIG. 4 is a schematic block diagram of an arrow tracking system 200 comprising a transmitter module 251 and a receiving module 101. The transmitter module 251 and the receiving module 101 may comprise analog circuitry, digital circuitry, or a combination of analog and digital circuitry.

In an embodiment, the transmitter module 251 comprises a series of inputs such as buttons 250a-250f, an I/O ("input/output") device 252, a transmitting device 254 which may include a microprocessor ("CPU") 256, and an antenna 258. The I/O device 252 receives a first input from a user when the user presses one of the button 250a through 250f. The I/O device 252 generates a first arrow identification signal 253 based on the first input from a user. The transmitter module 251 has a transmitting device 254 that receives the first arrow identification signal 253 from the I/O device 252. The transmitting device 254 generates a first RF signals 255 based on the first transmission data. A transmitting antenna 258 receives the first RF signals 255 and generates electromagnetic radiation 261. Electromagnetic radiation refers in general to radio waves, microwaves, and infrared light for example. In one or more embodiments, the term "electromagnetic radiation" may refer to RF radio waves.

In one or more embodiments, the transmitter module 251 and the receiving module 101 may identify a specific arrow though changes of RF frequency of the radio wave. For example, each button 250a-250f may correspond to a differing radio frequency, such as associating button 250a with a first frequency of 315 MHz, and button 250b with a second frequency of 316 MHz, and so forth.

In one or more embodiments, the transmitter module 251 may emit a common carrier wave which may be modulated to impress a signal identifying a user selection onto the carrier wave through such means as amplitude modulation ("AM") or frequency modulation ("FM").

The arrow receiving module 101 comprises a receiving antenna 212, a detection circuit 214, a sound annunciator 216, an optional LED 218, and a power source 210. The receiving antenna 212 receives the electromagnetic radiation 261 and communicates the signal to the detection circuit 214 coupled to the antenna 212. The detection circuit 214 analyzes the electromagnetic radiation 261 to determine if an identification signal associated with the arrow was received. The sound actuator 216 and an LED 218 are coupled to the detection circuit 214. The sound actuator 216 generates a sound and the LED 218 illuminates if the detection circuit 214 determines that the identification signal was received that was associated with the specific arrow. The sound annunciator 216 may comprise a piezoelectric element similar to those used in smoke detectors. The piezoelectric transducer element may be configured to emit a familiar "chirping" sound similar to that made by smoke detectors when the smoke detector battery is almost drained. Other forms of sound annunciators include speakers, transducers, piezo indicators, electromagnetic indicators, and alarms. Commercially available piezo indicators can emit a variety of sounds including bird chirping, chimes, pulses, siren, warble, and ringing. The power source 210 is employed to energize the receiving module 101. In one or more embodiments, the receiving module 101 is configured to be embedded in an arrow 1.

Figure 5:
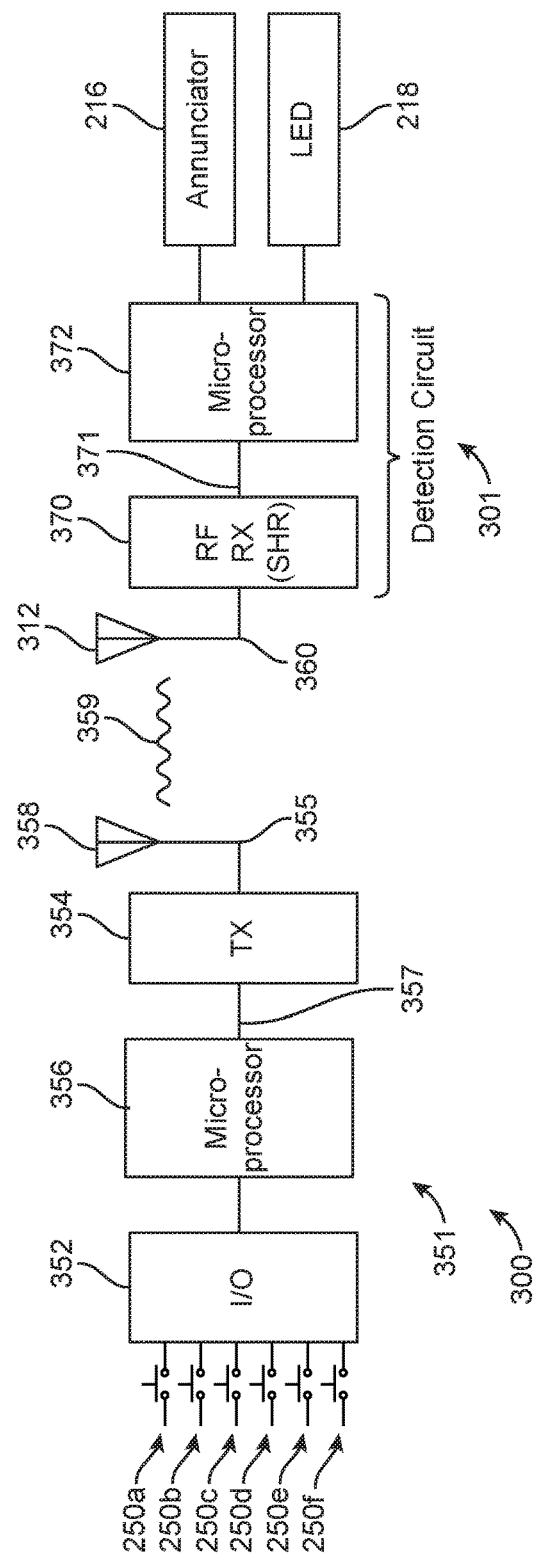
FIG. 5 is a schematic block diagram of the arrow tracking system employing a microprocessor.

FIG. 5 is a schematic block diagram of the arrow tracking system 300 employing a transmitter-side microprocessor 356 and a receiver-side microprocessor 372. The arrow tracking system 300 comprises a transmitter module 351 and a receiver module 301. The transmitter module 351 has an I/O device 352 coupled to switches 250a through 250f. The I/O device 352 is coupled to a microprocessor or controller 356 and is receiving a first input from a user via the buttons 250a-250f. The I/O device 352 is coupled to the microprocessor 356 and communicates the first input from the user. The first input signal identifies which of the buttons 250a-250f the user has pressed. The controller 356 generates a first arrow identification signal 357 based on the first input from a user. A transmitting device 354 receives the first arrow identification signal 357 from the controller 356, and the transmitting device 354 generates first RF signals 355 based on the first arrow identification signal 357. In one or more embodiments, the first arrow identification signal 357 may direct the transmitting device 354 to change the frequency of the RF signal or send a specific code over the RF signal. A transmitting antenna 358 receives the first RF signals 355 and generates electromagnetic radiation 359 which propagates around the transmitter module 351. The transmitter module 351 also has a power source and other components not shown explicitly.

The receiving module 301 comprises a receiving antenna 312 for receiving the electromagnetic radiation 359, which passes the RF signal 360 associated with the electromagnetic radiation 359 to a detection circuit comprising the RF receiver 370 and microprocessor 372. The RF receiver 370 receives the RF signal 360 and extracts the information associated with the arrow identification signal 371 from the RF carrier signal, which is then passed to controller or microprocessor 372. Microprocessor 372 analyzes the information associated with the arrow identification signal 371 and determines whether the arrow associated with arrow identification signal has been received. If the microprocessor 372 determines that the correct arrow identification signal has not been received, no further action will result in one or more embodiments. If the microprocessor 372 determines that the correct arrow identification signal has been received, the microprocessor 372 will then activate some form of an alert such as by activating a sound annunciator 216 or by illuminating a light or LED 218 in one or more embodiments. The receiving module 301 also has a power source and other components not shown explicitly.

In one or more embodiments, arrow tracking system 300 may employ an amplitude-shift keying ("ASK") to transmit the arrow identification to the receiver module 301 which is used in such applications such as automotive remote keyless entry, garage door openers, and other wireless controls. In one or more embodiments, the RF receiver 370 may comprise a super-heterodyne receiver employing an ASK demodulator.

Figure 6:
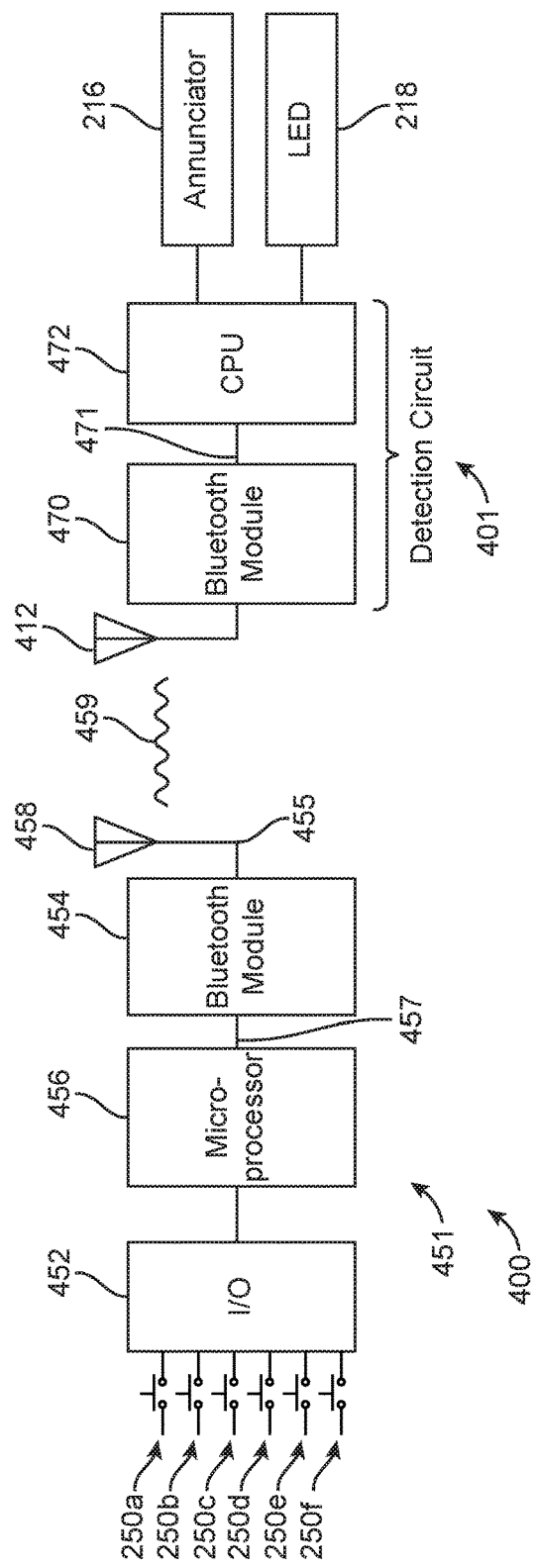
FIG. 6 is a schematic block diagram of the arrow tracking system employing Bluetooth modules.

FIG. 6 is a schematic block diagram of the arrow tracking system 400 employing Bluetooth® modules 454 and 470. Bluetooth® is a wireless technology standard that may be found on many currently available devices such as smart phones. The latest versions of devices following the Bluetooth® protocol have a range of 100 meters. While most smart phones currently available have a range of 10 meters, future generations may have longer ranges. In one or more embodiments, a smart phone may replace the transmitter module 451 described below and may employ a smartphone app to activate the receiver module 401.

The arrow tracking system 400 comprises a transmitter module 451 and a receiver module 401. The transmitter module 451 has an I/O device 452 coupled to switches 250a through 250f. The I/O device 452 is coupled to a microprocessor or controller 456 and is receiving a first input from a user via the buttons 250a-250f. The I/O device 452 is coupled to the microprocessor 456 and communicates the first input from the user. The first input signal identifies which of the buttons 250a-250f the user has pressed. The controller 456 generates a first arrow identification signal 457 based on the first input from a user. A Bluetooth® transmitting device 454 receives the first arrow identification signal 457 from the controller 456, and the Bluetooth® device 354 generates first RF signals 459 based on the first arrow identification signal 457. In one or more embodiments, the first arrow identification signal 457 may direct the transmitting device 454 to change the frequency of the RF signal or send a specific code over the RF signal. A transmitting antenna 458 receives the first RF signals 455 and generates electromagnetic radiation 459 which propagates around the transmitter module 451. The transmitter module 451 also has a power source and other components not shown explicitly.

The receiving module 401 comprises a receiving antenna 412 for receiving the electromagnetic radiation 459, which passes the RF signal associated with the electromagnetic radiation 459 to a detection circuit comprising the Bluetooth® Module 470 and microprocessor 372. The Bluetooth® module 470 receives the RF signal 460 and extracts the information associated with the arrow identification signal 471 from the RF carrier signal, which is then passed to controller or microprocessor 472. Microprocessor 472 analyzes the information associated with the arrow identification signal 471 and determines whether the arrow associated with arrow identification signal has been received. If the microprocessor 472 determines that the correct arrow identification signal has not been received, no further action will result in one or more embodiments. If the microprocessor 472 determines that the correct arrow identification signal has been received, the microprocessor 472 will then activate some form of an alert such as by activating a sound annunciator 216 or by illuminating a light or LED 218 in one or more embodiments. The receiving module 401 also has a power source and other components not shown explicitly.

Figure 7:
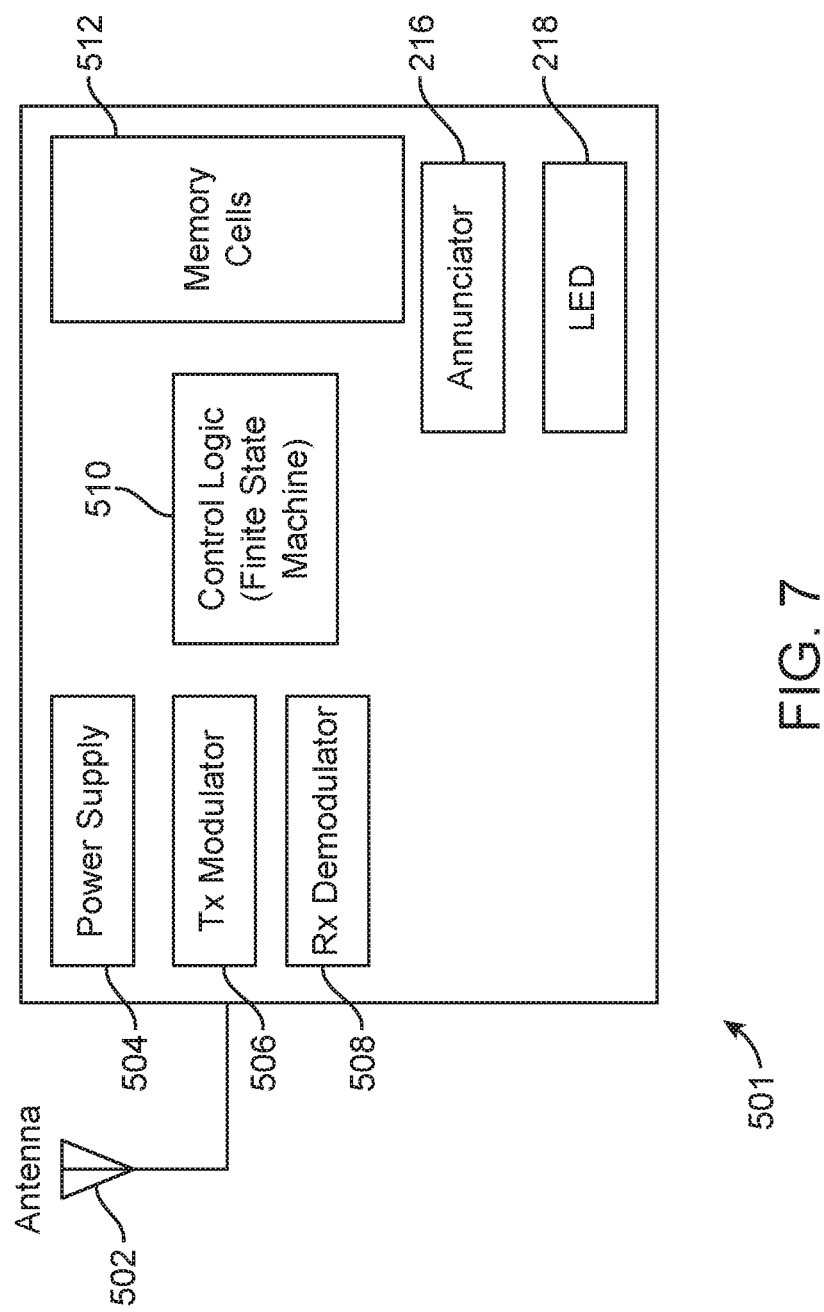
FIG. 7 is a schematic block diagram of the arrow tracking system employing RFID technology.

FIG. 7 is a schematic block diagram of the arrow receiving module 501 employing Radio-Frequency Identification ("RFID") technology. RFID technology is employed in many applications such as for tracking goods and inventories, as well as for automatic toll collection for cars using toll roads. Arrow receiving module 501 comprises an antenna 502, a transmitter ("TX) modulator 506, a receiver ("RX") modulator 508, control logic 510, and memory cells 512. A power supply 504 may be employed for longer range applications. An annunciator 216 and an LED 218 are coupled to the arrow receiving module 501.

A RFID reader (not shown) transmits an encoded radio signal to interrogate the arrow receiving module 501. In one or more embodiments, the arrow receiving module 501 interprets the radio signal to determine if it has been selected, and will then activate the annunciator 216 or LED 218 in response.

Figure 8:
FIG. 8 is a front view of a bow-and-arrow hunter using the arrow with the tracking electronics in one or more embodiments.

FIG. 8 is a front view of a bow-and-arrow hunter 2 using an arrow with the tracking electronics 1 in one or more embodiments. After a long hunt, the hunter 2 can retrieve his missing arrows 1 by using one or more of the embodiments described herein. Lost arrows are readily located by sight and by sound so that arrows lost in thatches or in darkness may be successfully retrieved.

Many of the components of the various embodiments depicted herein may share common features. For example, the transmitter modules and the receiving modules may each be formed on printed circuit boards, and may be encapsulated or otherwise protected from mechanical damage and moisture. The receiving antenna described herein may comprise a separate antenna formed of electrically conductive material embedded within the arrow, and may extend away from a metal arrow toward electrically unshielded portions of the metal arrow such as toward an unshielded nock. The receiving antenna may also be formed on a printed circuit board as a strip-line for example. The receiving antenna may also be based or formed on the arrow shaft.

The detection circuits described herein may be based on analog devices, digital devices such as microprocessors or digital signal processors, or a combination of analog and digital devices. A power source is implied in the transmitting and receiving modules, and may be based on batteries. The power source may include a means for recharging the batteries such as through inductive coupling. In one or more embodiments, the power source may also include a means for turning off or turning on power such as through the use of a switch, motion detector, or accelerometer for example.

Although the invention has been discussed with reference to specific embodiments, it is apparent and should be understood that the concept can be otherwise embodied to achieve the advantages discussed. The preferred embodiments above have been described primarily as devices for locating arrows. In this regard, the foregoing description of the devices for locating arrows is presented for purposes of illustration and description.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. An arrow nock assembly comprising:
    a nock for an arrow, the nock having a bow string receiving portion and a nock internal cavity opposite from the bow string receiving portion; and
    a receiving module coupled to the nock, the receiving module comprising:
        a receiving antenna for receiving electromagnetic radiation;
        a detection circuit coupled to the receiving antenna, the detection circuit analyzing the electromagnetic radiation to determine if an identification signal associated with the arrow was received;
        a sound actuator coupled to the detection circuit, and,
        a power source for energizing the receiving module,
    wherein the receiving module is configured to be embedded in an arrow.

2. The arrow nock assembly of claim 1 further comprising a generally cylindrical locking portion coupled to the arrow nock assembly, wherein the locking portion is configured to couple with a shaft of the arrow.

3. The arrow nock assembly of claim 1, wherein the detection circuit further comprises a microprocessor.

4. The arrow nock assembly of claim 1, wherein the detection circuit further comprises a super-heterodyne receiver for use with amplitude-shifted keyed data.

5. The arrow nock assembly of claim 1, wherein the detection circuit further comprises a Bluetooth receiving module.

6. The arrow nock assembly of claim 1, wherein the detection circuit further comprises an RFID device.

7. The arrow nock assembly of claim 1, further comprising a Light Emitting Diode.

8. The arrow nock assembly of claim 1, wherein the sound annunciator comprises a piezo-electric buzzer.

9. An arrow receiving module configured to be embedded in an arrow, the receiving module comprising:
   an antenna for receiving electromagnetic radiation;
   a detection circuit coupled to the antenna, the detection circuit analyzing the electromagnetic radiation to determine if an identification signal was received;
   a sound actuator coupled to the detection circuit, the sound actuator generating sound when the identification signal was received; and
   a power source for energizing the receiving module.

10. The arrow receiving module configured to be embedded in the arrow of claim 9, wherein the detection circuit further comprises a microprocessor.

11. The arrow receiving module configured to be embedded in the arrow of claim 9, wherein the detection circuit further comprises a super-heterodyne receiver for use with amplitude-shifted keyed data.

12. The arrow receiving module configured to be embedded in the arrow of claim 9, wherein the detection circuit further comprises a Bluetooth receiving module.

13. The arrow receiving module configured to be embedded in the arrow of claim 9, wherein the detection circuit further comprises an RFID device.

14. The arrow receiving module configured to be embedded in the arrow of claim 9, further comprising a Light Emitting Diode.

15. The arrow receiving module configured to be embedded in the arrow of claim 9, wherein the sound annunciator comprises a piezo-electric transducer.

16. An arrow having an arrow receiving module, the arrow comprising:
   an arrow shaft having a distal and a proximal end;
   a nock coupled to the proximal end of the arrow shaft; the nock having a nock internal cavity; and
   an arrow receiving module embedded within the arrow, the arrow receiving module comprising:
     an antenna for receiving electromagnetic radiation;
     a detection circuit coupled to the antenna, the detection circuit analyzing the electromagnetic radiation to determine if an identification signal was received;
     a sound actuator coupled to the detection circuit, the sound actuator generating sound when the identification signal was received; and,
     a power source for energizing the receiving module.

17. The arrow having an arrow receiving module of claim 16, wherein the detection circuit further comprises a microprocessor.

18. The arrow having an arrow receiving module of claim 16, wherein the detection circuit further comprises a super-heterodyne receiver for use with amplitude-shifted keyed data.

19. The arrow having an arrow receiving module of claim 16, wherein the detection circuit further comprises a Bluetooth receiving module.

20. The arrow having an arrow receiving module of claim 16, wherein the detection circuit further comprises an RFID device.

* * * * *